3,808,163
WATER-SOLUBLE COATING COMPOSITION
Howard J. Wright and John W. Bradley, Kansas City, Mo., assignors to Cook Paint and Varnish Company, Kansas City, Mo.
No Drawing. Filed Sept. 12, 1972, Ser. No. 288,325
Int. Cl. C09d 3/52, 5/02
U.S. Cl. 260—23 CP                    3 Claims

ABSTRACT OF THE DISCLOSURE

Film-forming polymer compositions of low organic solvent content are obtained by polymerizing two or more acrylic monomers in the presence of castor oil. The product is readily soluble in water and the resulting aqueous solutions thereof can be blended with melamine-formaldehyde resins or the like and baked to give films and coatings of outstanding properties.

BACKGROUND OF THE INVENTION

The present invention is concerned with film-forming polymer compositions of low organic solvent content which are uniquely useful as coating materials or the like.

Because of pollution problems, considerably effort is being expended towards developing compositions which have a high solids content and/or contain a minimum of volatile organic solvent, particularly no more than 20% by volume of such solvent. The principal object of the invention is to provide such compositions. Other objects will also be hereinafter apparent.

SUMMARY OF THE INVENTION

The compositions of the invention are obtained by polymerizing two or more acrylic monomers, usually but not necessarily in an organic solvent, in the presence of castor oil. The product is readily solubilized in water and the resulting aqueous solutions thereof can be blended with melamine-formaldehyde resins or the like and baked to give films and coatings of outstanding properties.

The success of the invention is dependent, at least in large measure, in the use of castor oil during the polymerization of the acrylic monomers. Thus, the advantages of the invention have not been realized using other oils such as linseed, sapphire, coconut and soya oils. The castor oil makes it possible to cut down substantially on the amount of solvent used in the polymerization. Additionally, the castor oil, as distinguished from the other oils mentioned above, gives a stable polymer composition in water. However, this is not the only function or advantage using castor oil herein. Water-soluble or solubilizible unmodified acrylic polymers are known but these are generally poor at wetting pigments and even worse at wetting various substrates, e.g. metal. Thus, on metal, such unmodified acrylics tend to crawl and eye-hole presenting very uneven films. The castor oil-modified acrylic polymer of the invention, however, helps wet pigment so that there is no trouble in obtaining a high gloss and the castor oil modified product is outstanding for wetting various substrates, even forming a good film without crawing over wet, oil-based inks.

The castor oil or the equivalent is thus an important and essential aspect of the acrylic polymer used herein. It should also be noted that it is essential to have the castor oil present during the polymerization, i.e., equivalent results cannot be obtained by adding the castor oil to the otherwise pre-formed acrylic polymer.

DETAILED DESCRIPTION OF THE INVENTION

Apart from including the castor oil in the polymerization, the acrylic polymer is prepared in conventional manner (see, for example, U.S. Pat. 3,215,756). Advantageously the polymer is obtained by polymerizing (a) one or more ethylenically unsaturated monomers containing reactive hydroxy, carboxylic acid or anhydride groups and (b) one or more different ethylenically unsaturated monomers, the latter usually being used in excess. Normally, the polymer will have an acid number of 20–150, preferably 40–80.

Typical monomers (a) are hydroxy propyl methacrylate, hydroxy ethyl methacrylate, hydroxy ethyl acrylate, hydroxy propyl acrylate, acrylic acid, methacrylic acid, maleic acid and maleic anhydride. Monomers (b) include styrene, α-substituted lower alkyl styrenes such as α-methyl styrene, alkyl esters of acrylic and methacrylic acids, especially the lower alkyl esters thereof, e.g. methyl methacrylate, methyl and ethyl acrylate, acrylonitrile, acrylamide, and mixtures of two or more of these materials. The relative amounts of monomers (a) and (b) in the copolymer may be varied but, in any event, the copolymer must comprise sufficient amounts of monomers (a) and (b) to give an acid number within the limits indicated heretofore.

The polymerization is usually carried out by mixing together monomers (a) and (b) with the castor oil component. The castor oil will preferably comprise from about 15–50% by weight of the total solids subjected to polymerization although amounts outside this range, e.g. 70–80%, depending on the ultimate use, may be utilized. Usually the mixture is heated to a temperature of 90° to 200° C., preferably 165° C. to 190° C. This polymerization may be carried out in bulk or in solution using such conventional solvents as aromatic hydrocarbons, typically benzene, toluene, and xylene, alcohols (e.g. butyl alcohol or butyl cellosolve) or esters such as butyl carbitol acetate, and the like. Usually, the desired polymerization is completed in up to about 7–15 hours, depending upon other operating conditions, e.g. the monomers involved, the temperture, etc.

The polymerization is preferably carried out in the presence of a polymerization catalyst, typically, peroxides such as benzoyl peroxide, di-tertiarybutyl-peroxide, dicumene peroxide and methyl-ethyl ketone peroxide, or other catalysts of the free-radical type. Chain transfer agents of the conventional type, e.g. lauryl mercaptan, may also be included in the polymerization.

The castor oil-modified acrylic polymer is not itself water-soluble but it can be solubilized by the addition thereto of an appropriate base, e.g. alkali metal hydroxide, such as sodium or potassium hydroxide, ammonium hydroxide or an amine in water. Usually, this solubilizing reaction is effected at room temperature (e.g. 20–25° C.) although it may be desirable to heat the mixture somewhat to expedite preparation of the solution. The amount of hydroxide or amine utilized will vary depending upon other conditions but should be sufficient to give the desired water-solubility. This usually means adding sufficient base to give a pH of 6 to 12 or, stated another way, from 4 to 15% base, on the weight of the reaction product. However, the percentage of base may vary outside these limits depending, for example, on the acid number of the product and the molecular weight of the base used.

Typical amines which may be used herein in lieu of, or in addition to, the alkali metal and ammonium hydroxides for preparing the water-soluble salt of the present invention are: dimethyl ethanolamine, diethylamine, dimethylamine, triethanolamine, ethylene-diamine, triethylamine, morpholine, 2-amino-gammamethyl-1-propanol and di-isopropylamine.

The solubilized products of the invention contain less than 20% by volume organic volatiles. These aqueous solutions can be blended with urea- or melamine-formaldehyde precondensate or like thermosetting components, together with pigments and the like to make highly useful coating compositions. These compositions can be cast onto a wide variety of substrates, e.g. metals and baked to give coatings or films of outstanding properties.

In another embodiment of the invention, the pre-solubilized products may be used directly as high solids coating vehicles which can be blended with epoxy resins, isocyanate prepolymers, urea-formaldehyde or melamine-formaldehyde precondensates to give coating compositions containing less than 20% by volume organic volatiles.

The invention is illustrated by the following examples which are given for purposes of illustration only, parts and percentages being given on a weight basis:

EXAMPLE 1

The following materials were used to prepare an acrylic polymer:

| | Parts |
|---|---|
| Butyl Cellosolve | 20.0 |
| Castor oil | 22.0 |
| Acrylic acid | 4.91 |
| Butyl acrylate | 21.80 |
| Styrene | 13.62 |
| Methyl methacrylate | 10.90 |
| Hydroxy propyl methacrylate | 3.27 |
| Cumene hydroperoxide | 2.00 |
| Di-tert. butyl peroxide | 1.50 |

The castor oil and butyl Cellosolve were placed in a flask and the acrylic monomers and peroxides were added thereto over a period of 3–5 hours with heating at 160°–172° C. after which the mixture was held for 4–6 hours at reflux. The resulting polymerization mixture analyzed as follows:

| | |
|---|---|
| Non-volatiles, percent | 80.1 |
| Viscosity (Gardner-Holdt) | Z4 |
| Acid number | 40.8 |

The castor oil seemed to function at least partly as a diluent for the system.

The product was solubilized by suspending the same in water and adding dimethyl ethanolamine to the resulting suspension at 25° C. until a clear solution was obtained. The resulting solution was then blended with a conventional melamine-formaldehyde cross-linking condensate (i.e. "Cymel" 303, methoxylated melamine formaldehyde precondensate), coated onto a steel substrate and baked at 350° F. for 6 minutes to give a clear film of outstanding properties. Equivalent results are obtained by baking for 30 minutes at 250° F. using the indicated melamine-formaldehyde precondensate or, for example, butylated melamine-formaldehyde precondensate.

Example 2

An acrylic polymer was prepared as in Example 1 using the following materials:

| | Parts |
|---|---|
| Butyl Cellosolve | 20.0 |
| Castor oil | 22.0 |
| Hydroxy propyl methacrylate | 15.0 |
| Butyl acrylate | 18.96 |
| Styrene | 11.46 |
| Methyl methacrylate | 9.08 |
| Lauryl mercaptan | 2.00 |
| Di-tert. butyl peroxide | 1.50 |

The polymer had the following characteristics:

| | |
|---|---|
| Non-volatiles, percent | 80 |
| Viscosity | Y-Z |
| Acid number | 6.2 |

This product was then directly blended on a 1:1 NCO/OH equivalence with a high solids urethane prepolymer (Desmodur N, i.e. the biuret of hexamethylene diisocyanate), the resulting composition being cast onto a glass substrate and baked for 20 minutes at 180° F. to give an outstanding film.

Having described the invention, what is claimed as new is:

1. A composition comprising a blend of (1) an aqueous solution of a polymer which has been solubilized by the addition thereto of solubilizing bases, said solution containing less than 20% by volume of organic volatiles and (2) a urea-formaldehyde or melamine-formaldehyde condensate, said polymer being obtained by polymerizing in the presence of castor oil, (a) one or more ethylenically unsaturated monomers containing reactive hydroxy, carboxylic acid or anhydride groups selected from the group consisting of hydroxy propyl methacrylate, hydroxy ethyl methacrylate, hydroxy ethyl acrylate, hydroxy propyl acrylate, acrylic acid, methacrylic acid, maleic acid and maleic anhydride and (b) one or more different ethylenically unsaturated monomers, free from such reactive groups and present in excess, said monomer (b) being selected from the group consisting of styrene, alpha-substituted lower alkyl styrene lower alkyl esters of acrylic and methacrylic acid, acrylonitrile and acrylamide, the proportions of (a) and (b) being such as to give a polymer having an acid number of 20–150 and the amount of castor oil comprising from about 15% to 80% by weight of the total solids subjected to polymerization.

2. The composition of claim 1 wherein said monomers include styrene with acrylic acid, methyl methacrylate and hydroxy propylmethacrylate.

3. The process which comprises applying the composition of claim 1 to a substrate and baking.

References Cited

UNITED STATES PATENTS

| 3,248,397 | 4/1966 | Purcell | 260—23 CP |
| 3,127,365 | 3/1964 | Floyd | 260—23 CP |
| 3,207,815 | 9/1965 | Joo et al. | 260—23 CP |
| 2,882,251 | 4/1959 | Christendon | 260—23 CP |
| 3,030,321 | 4/1962 | Lombardi | 260—23 CP |

DONALD E. CZAJA, Primary Examiner

R. W. GRIFFIN, Assistant Examiner

U.S. Cl. X.R.

117—124 E, 132 R, 132 BF, 161 C, 161 LN, 161 UZ; 260—17 R, 21, 29.4 UA